United States Patent [19]

Olson

[11] 4,348,151

[45] Sep. 7, 1982

[54] TRUCK WINCH ASSEMBLY

[75] Inventor: Lorimer Olson, Hawarden, Canada

[73] Assignee: WGM Safety Corp., Franklin, Pa.

[21] Appl. No.: 151,180

[22] Filed: May 19, 1980

[51] Int. Cl.³ .............................................. B60P 1/48
[52] U.S. Cl. .................................. 414/542; 212/182; 254/323
[58] Field of Search ............................ 414/540–542, 414/549; 212/182, 187, 175, 180, 181; 254/323, 325–327

[56] References Cited

U.S. PATENT DOCUMENTS

| | | |
|---|---|---|
| 1,464,131 | 8/1923 | Goodger . |
| 2,292,870 | 8/1942 | Dixon . |
| 2,616,666 | 11/1952 | Honey ............................. 254/327 |
| 2,746,619 | 5/1956 | Kuhlenschmidt et al. . |
| 3,276,610 | 10/1966 | Thatcher . |
| 3,341,038 | 9/1967 | Wicklund . |
| 3,613,918 | 10/1971 | Kruschke . |
| 3,794,192 | 2/1974 | Monson . |
| 3,885,686 | 5/1975 | Siebring . |
| 3,912,093 | 10/1975 | Kruschke . |

Primary Examiner—Robert G. Sheridan
Attorney, Agent, or Firm—Charles H. Lindrooth

[57] ABSTRACT

A frame assembly is secured within an open topped truck box and includes a pair of side frames and head rack at the front of said truck box. A lifting yoke is mounted on rollers between the side frames and when in the elevated or winching position, it can be rolled along the side frames from a forward position to a rearward position and vice versa and a winch assembly is mounted upon the lifting yoke for loading and unloading items upon or from the truck box. Brake clamps are provided to lock the lifting yoke in position along the side frames. When not in use, the lifting yoke may be stored by pivoting the yoke forwardly until it lies upon the outer sides of the side frame whereupon it is detachably locked to the head rack. By routing the winch cable around pulleys on the yoke and on the side frame assembly, the winch can be used to partially elevate the lifting yoke from the stored position to adjacent the winching position and vice versa.

13 Claims, 10 Drawing Figures

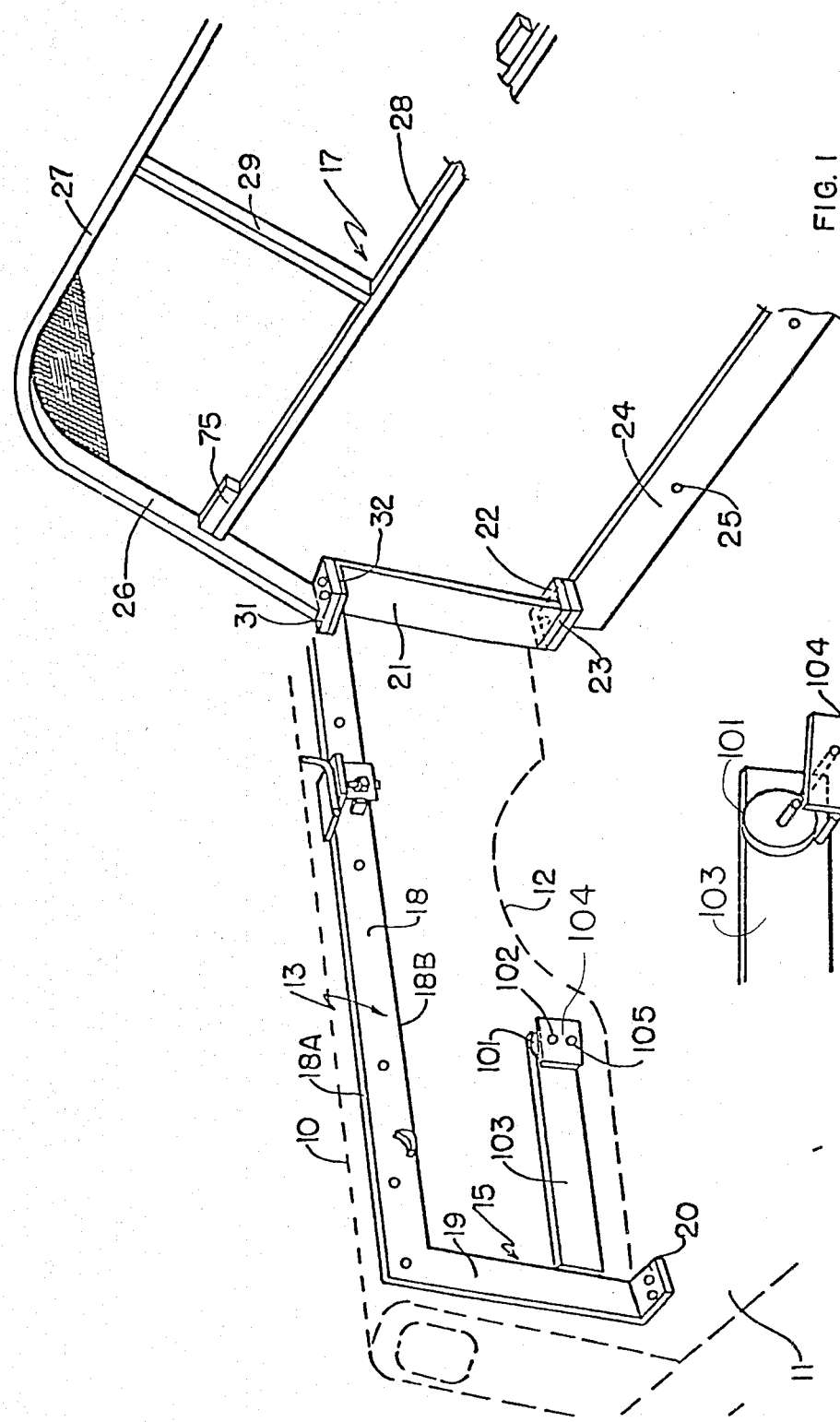
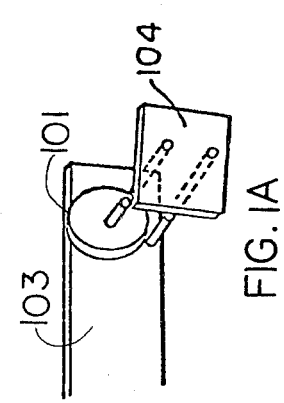
FIG. 1
FIG. 1A

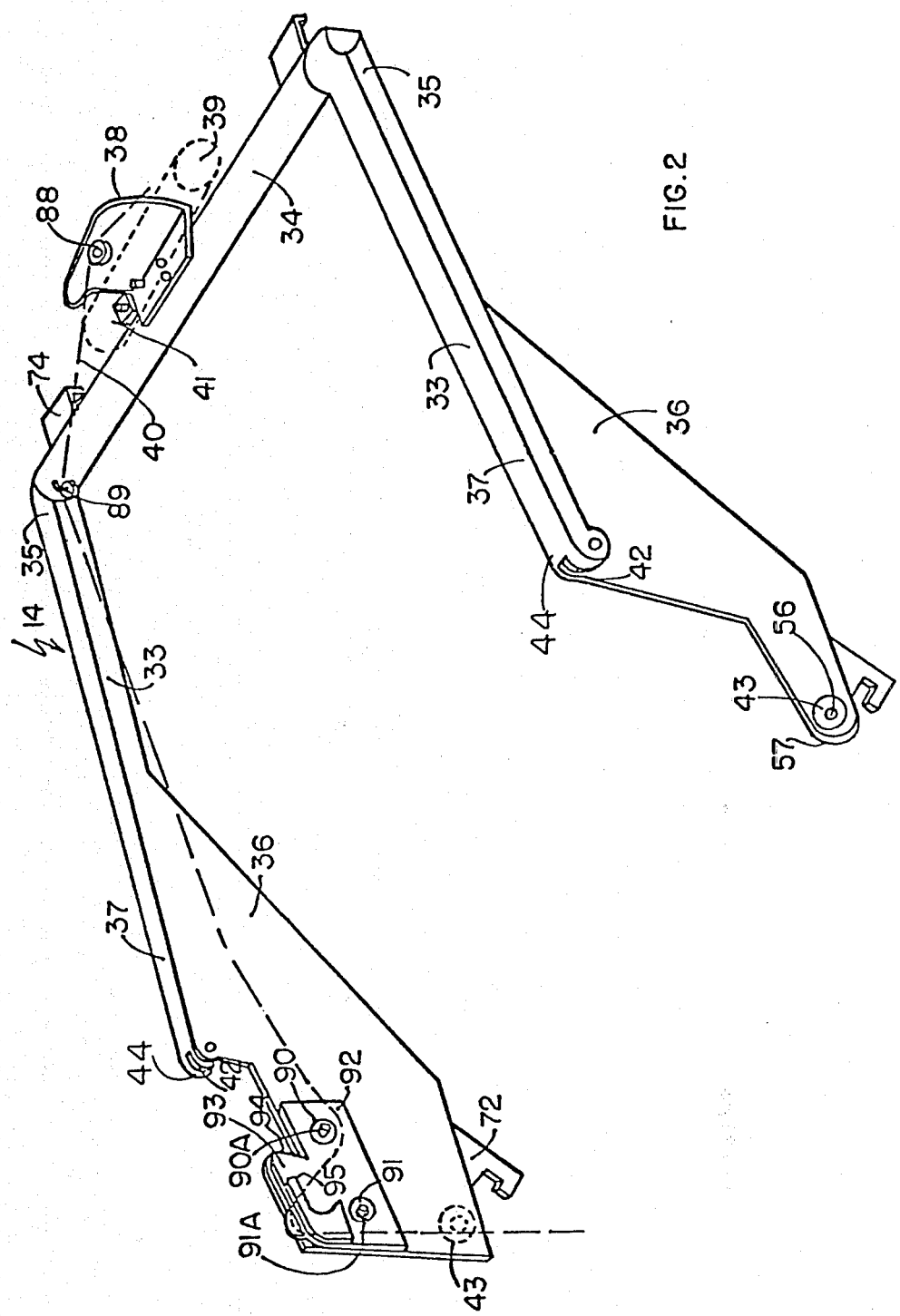

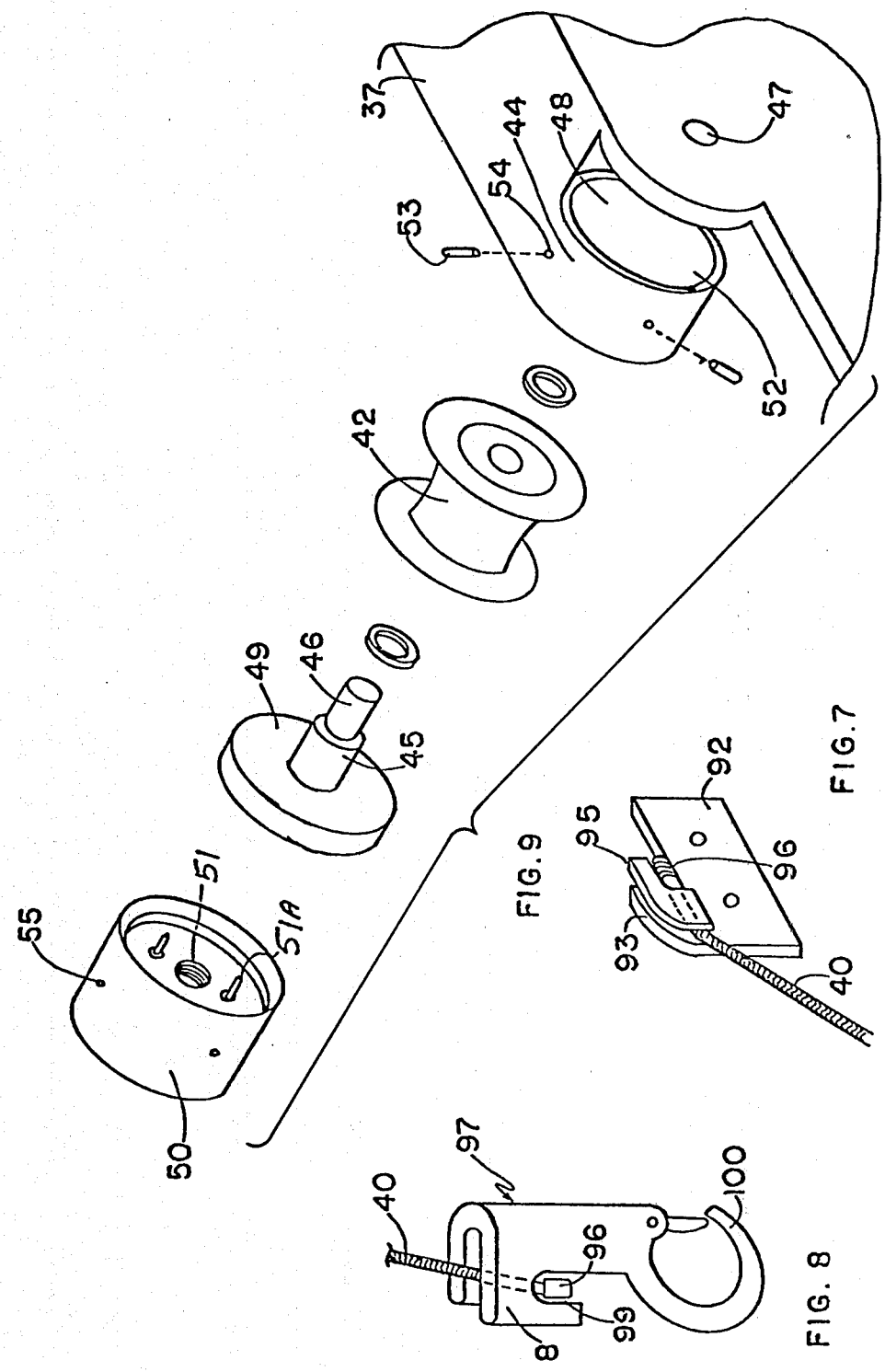

TRUCK WINCH ASSEMBLY

BACKGROUND OF THE INVENTION

This invention relates to new and useful improvements in truck winch assemblies, particularly truck winch assemblies adapted for use in trucks with open topped boxes.

Attempts have been made to provide winching assemblies for use with truck boxes in order to facilitate the loading and unloading of material or equipment and other items to and from the truck box and these usually incorporate overhead winch assemblies which are fixed in position and overhang the rear of the truck box so that material upon the ground can be elevated. However, it then has to be swung manually into the truck box and vice versa when material is unloaded. Furthermore such devices take up considerable room and interfere with the normal storage capacity of the truck box.

Overhead crane assemblies upon rollers are also known but once again these are permanently in the erected position, are relatively expensive and otherwise unsuited for incorporation in trucks, particularly light-duty trucks.

SUMMARY OF THE INVENTION

The present invention overcomes these disadvantages by providing a frame assembly which is easily attachable within a truck body and takes up very little room therein so that it does not interfere with the normal storage capacity of the truck box. The lifting yoke can be pivoted from a horizontal stored position whereupon it lies along the upper sides of the frame and across the front of the frame, to an elevated or lifting position whereupon it can be rolled forwardly or rearwardly relative to the truck box so that a winch assembly associated with the lifting yoke, can be used to not only lift material into and out of the box but to assist in moving it along the floor of the box.

One aspect of the invention consists of a truck winch assembly for use in truck bodies which include a pair of side walls, a floor and a front wall; comprising in combination a frame assembly attachable within the truck body, a lifting yoke, means mounting said lifting yoke within said frame assembly for movement from a substantially horizontal stored position to an elevated winching position and vice versa, said last mentioned means also cooperating with said frame assembly for moving said lifting yoke along said frame assembly from a forward position to a rearward position and vice versa and means on the front of said frame assembly for detachably locking said lifting yoke in the stored position.

Another advantage of the present invention is to provide a device of the character herewithin described which may be detachably locked in the horizontal stored position so that it is immovable relative to the truck body.

Another advantage of the present invention is to provide a device which may, if desired, utilize the winch to partially elevate and lower the lifting yoke relative to the frame assembly.

A still further advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a fragmentary isometric view of the frame assembly per se with part of the truck body shown in phantom.

FIG. 1A is a fragmentary exploded view of a portion of the structure shown in FIG. 1.

FIG. 2 is an isometric view of the lifting yoke per se.

FIG. 7 is a fragmentary isometric view showing one method of detachably attaching the cable to the lift yoke.

FIG. 8 is a fragmentary isometric view showing the same cable detachably secured to a lifting hook.

FIG. 9 is an exploded isometric view showing one of the upper roller assemblies.

In the drawings like characters of reference indicate corresponding parts in the different figures.

DETAILED DESCRIPTION

Figure 3:
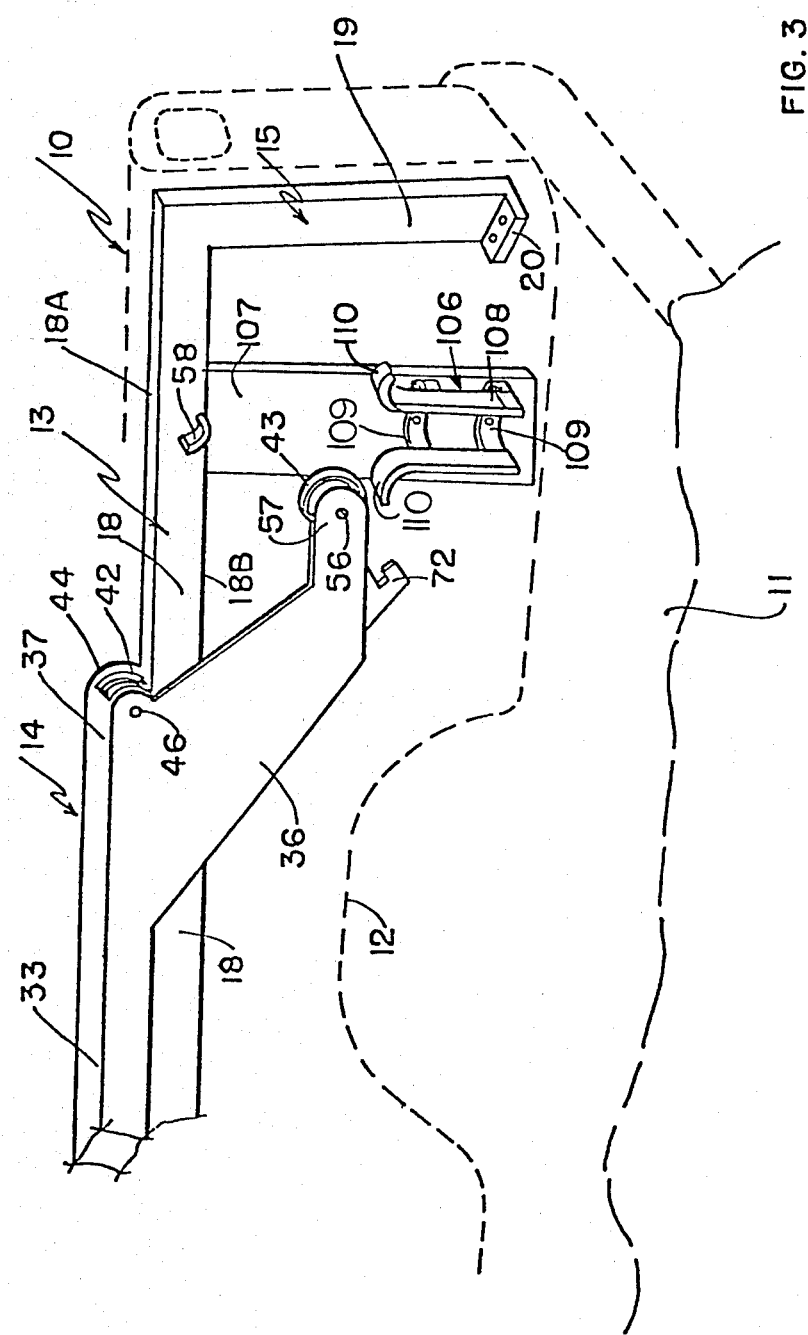
FIG. 3 is a fragmentary isometric view of the rear righthand side of the frame assembly showing a portion of the yoke assembly in the stored position.

Proceeding therefore to describe the invention in detail, a part of a conventional truck box is shown in phantom and includes spaced and parallel side members 10, a substantially horizontal floor 11 with wheel wells 12 adjacent the side panels, with the remainder of the truck (not illustrated) being conventional. It should be noted that the truck body is open topped, the purpose of which will hereinafter become apparent.

The invention includes a frame assembly collectively designated 13 and a yoke assembly collectively designated 14.

The frame assembly includes a pair of spaced and parallel, substantially vertical side frames collectively designated 15 and 16, together with a head rack collectively designated 17. The lefthand side frame shown in FIG. 1 includes an upper, substantially horizontal rail 18, and a rear vertical support member 19 having a flange 20 at the lower end thereof by which it may be bolted to the truck floor 11. A front vertical support member 21 extends downwardly from the front end of rail 18 and a flange 22 on the lower end thereof is bolted to flange 23 on one end of a front box mount 24 which extends transversely across the front of the box and is secured thereto by means of bolts or the like extending through apertures 25 formed in the transverse member 24. Conventional nut and bolt assemblies connect flanges 22 and 23 together.

Figure 5:
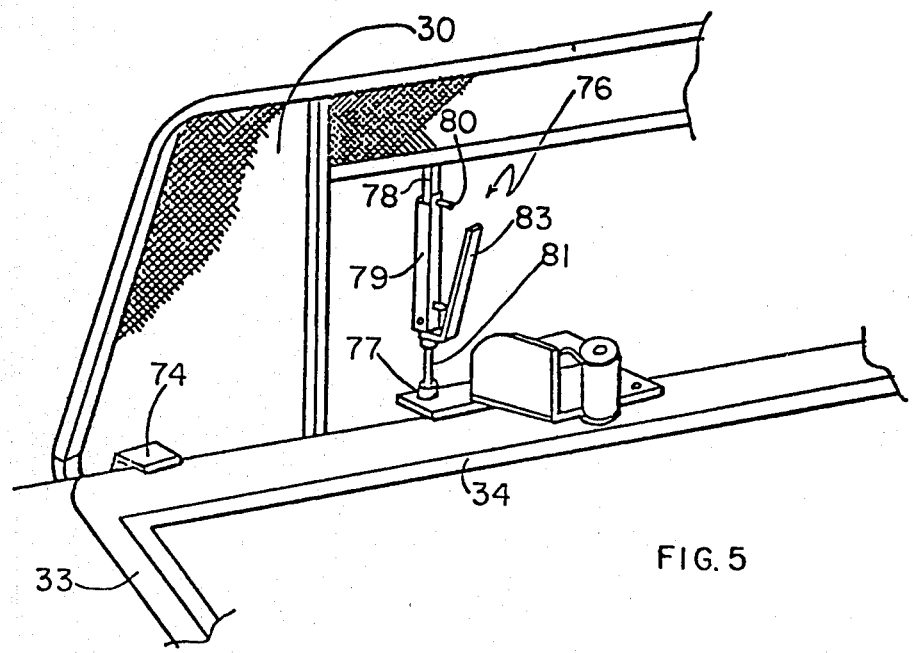
FIG. 5 is a fragmentary isometric view of the front portion of the frame showing the front portion of the yoke assembly in the locked position.

The head rack 17 includes vertical side members 26 and the transverse overspanning member 27 together with a lower transverse support member 28 and vertical members 29 extending between the members 27 and 28 for stiffening purposes and the head rack is preferably partially enclosed with expanded metal 30 or the like as shown in FIG. 5.

Flange 31 is provided at the lower end of the side members 26 and is bolted to an upper flange 32 situated at the upper end of front vertical members 21 of the side frames 15.

The frame assembly 13 is therefore secured within the truck box against the inner walls of the sides and the inner wall of the front panel thus taking up very little room and not interfering with the storage and transportation of bulky items and the like within the truck body.

It is of course easily detached, particularly the head rack 17, merely by disconnecting the head rack from the flanges 32. This detachability is desirable particularly if the truck is to be used with a truck camper or cab top or the like.

The lifting yoke collectively designated 14 comprises a pair of spaced and parallel side members 33 together with a winch support member 34 spanning the upper ends 35 of the side members 33 as clearly illustrated. Mounting flanges 36 are secured to and extend from one side of the lower portions 37 of the side members 33 upon which a conventional electric winch assembly 39 is situated. This winch assembly is shown in phantom in FIG. 2 and includes a winch cable 40 extending from the winch spool 41 as will hereinafter be described.

Means are provided to mount the lifting yoke 14 upon the upper rails 18 of the side frames 13, said means taking the form of upper rollers 42 and lower rollers 43. The upper rollers 42 are journalled for rotation within the fork ends 44 of the portions 37 of the side members 33 and details of this mounting are shown in FIG. 9. The roller 42 takes the form of a spool journalled for rotation upon a roller axle 45, and extension 46 of which engages an aperture 47 in the end 44 with the spool roller being situated within the fork 48 and a flange 49 is provided on the other end of the spindle or shaft 45. An electrical control receptable 50 is internally screw threaded as at 51 and includes pins 51A to receive conventional electrical switch (not illustrated) normally supplied with the winch assembly 39. This receptacle 50 engages the cylindrical leg portion 52 of the fork end 44 and is locked in position by means of screw threaded keeper pins 53 engaging through apertures 54 in the wall of the cylindrical portion 52 and into screw threaded apertures 55 within the cylindrical casing of the portion 50 thus locking the assembly in position and mounting the roller 43 for rotation within the ends 44.

The lower rollers are similar in configuration to the rollers 43 and are journalled for rotation upon spindles 56 secured and extending from the lower ends 57 of the flanges 36 as clearly shown.

When the lifting yoke is engaged upon the rails 18 of the side frames, the rollers 42 are above the upper sides or edges 18A of the rails and the rollers 43 are situated below the lower sides or edges 18B and this lifting yoke is movable from a horizontal, stored position shown partially in FIG. 3 to an elevated or winch position shown partially in FIG. 4 as will hereinafter be described.

Figure 4:
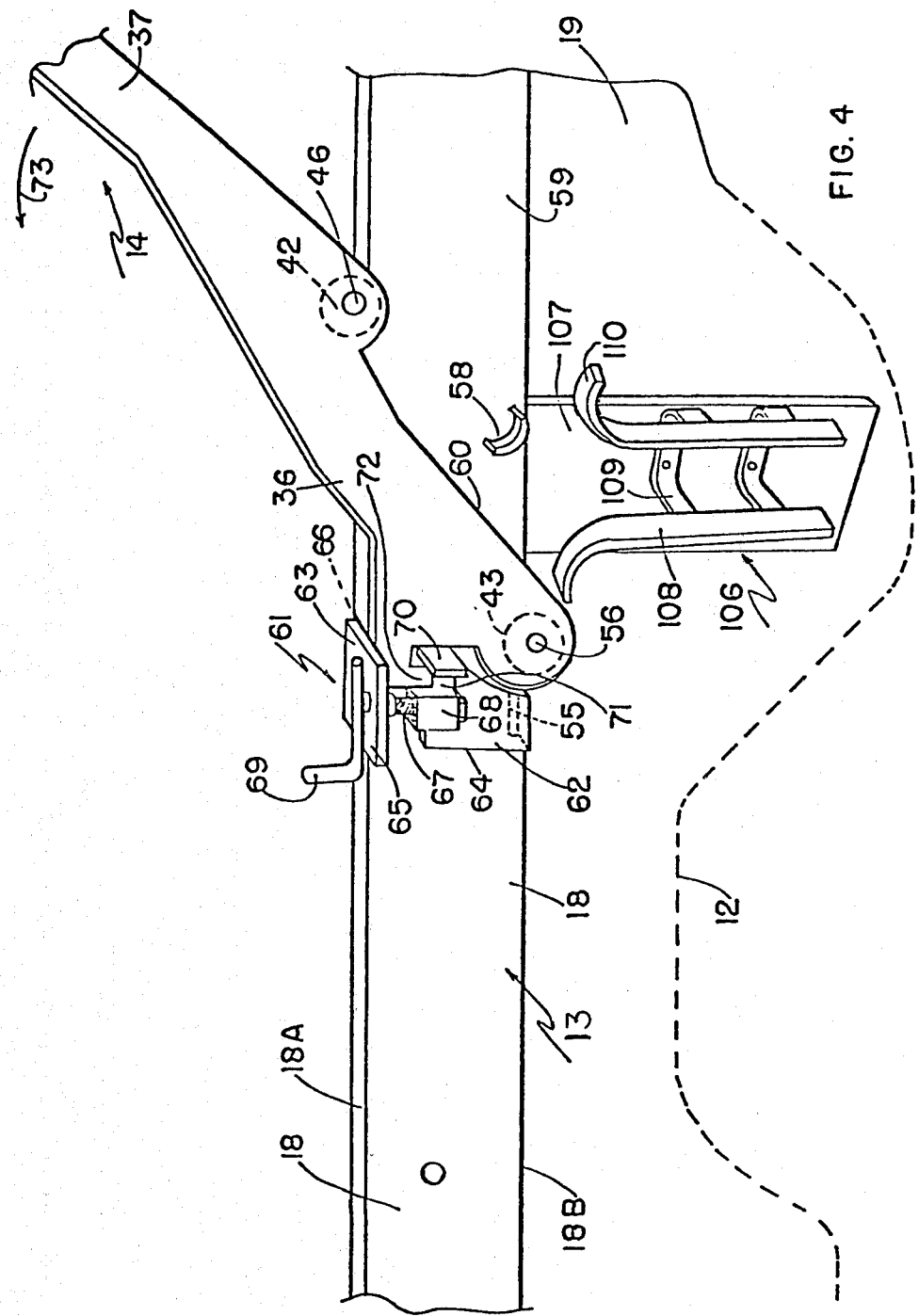
FIG. 4 is a view similar to FIG. 3 but showing the yoke assembly in the winch position.

To mount the yoke upon the rails, it is manually held in a substantially vertical position between the rails and manipulated sideways until the upper rollers 42 engage the upper sides of rails 18 and the lower rollers 43 engage the lower sides whereupon it may be tipped rearwardly to the position shown in FIG. 4 in which position, the lifting yoke 14 inclines rearwardly relative to the truck body at an angle of approximately 70° to 80°. However this angle can of course be varied as desired. When in this position it can be rolled forwardly and rearwardly along the rails 18 as desired so that the winch 39 for example can hang over the rear of the truck body floor for picking up or lowering loads relative to the truck body or, it can be moved forwardly so that objects or material can be lowered onto the floor or lifted from the floor by means of the winch 39.

In this regard, stops 58 may be secured to the inner-surfaces 59 of the side rails 18 against which the rear edges 60 of the flanges 36 may engage thus limiting the rearward movement of the lifting yoke when in the position illustrated in FIG. 4.

Means are provided to detachably lock the lifting yoke in position anywhere along the length of the rails 18, said means taking the form of a lock assembly collectively designated 61. It consists of a lower jaw 62 and an upper jaw 63. The lower jaw includes the vertical wall portion 64 with an underlying jaw 55 engaging around the underside edge 18B of the rail 18. The upper jaw includes a horizontal plate 65 with a downturned outer edge 66 engaging over the upper edge 18A of the rail 18.

A screw threaded clamp bolt 67 screw threadably engages a nut 68 secured to the vertical plate 62 of the lower jaw with the upper end of the bolt freely rotating within an aperture in the horizontal plate 65 of the upper jaw 63. This is rotated by means of crank 69 and is adapted to clamp the two jaws together around the member 18 so that they can be slid along the member without becoming detached therefrom but can be clamped in position if the crank 69 is tightened further. A brake lock 70 extends upwardly from an offstanding lug 71 extending from nut 68 and this is engaged by a downturned lug portion 72 formed on the flange 36 and offstanding therefrom adjacent the roller 43. When in the position shown in FIG. 4, element 72 is engaged over element 70 so that when the crank 69 is not tightened fully, the brake assembly or lock assembly 61 is drawn along the rails 18 by means of the movement of the lifting yoke 14. However, when it is desired to lock the lifting yoke in position upon the rails 18, crank 69 is tightened fully thus locking the assembly. When it is desired to move the lifting yoke from the winch position illustrated in FIG. 4, to the horizontal stored position shown in FIG. 3, the lifting yoke is disengaged from the brake or lock assemblies 61 whereupon it may be moved in the direction of arrow 73 (see FIG. 4) and in effect pivoted relative to the rails 18 so that it takes up the position shown in FIG. 3 with the side members 33 lying on top of the rails 18 and with the cross member 34 of the lifting yoke in the fully forward position against the head rack 17 as shown in fragmentary form, in FIG. 5. Preferably the lock or clamp assemblies 61 are moved along the rails 18 to the position shown in FIG. 1 whereupon they are clamped in position with the side members 33 of the lifting yoke resting upon the upper surface of the horizontal plates 65 of these locking or clamping assemblies.

When in the position shown in FIG. 5, angled latches 74 secured to the upper side of the cross member 34 adjacent either end thereof, engage over latch blocks 75 secured to the lower cross member 28 of the head rack 17 thus locating the lifting yoke relative to the head rack so that an over center lock assembly collectively designated 76 may be detachably engaged with the lifting yoke to detachably lock it in the stored position.

Figure 6:
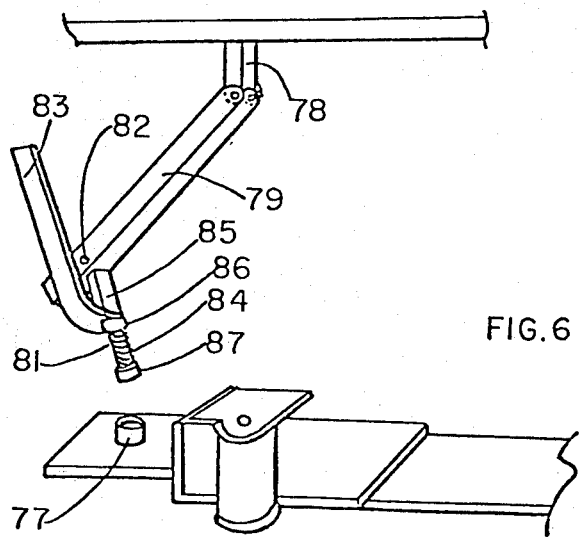
FIG. 6 is a view similar to FIG. 5 but showing the lock in the released position.

This over center lock assembly 76 is shown in detail in FIGS. 5 and 6 and it will be noted that a latch receiving socket 77 is provided upon one side of the mounting plate 38 for the winch assembly 39. However other extensions from the mounting plate 38 may be provided depending upon design parameters.

The over center lock assembly includes an upper mounting block 78, an intermediate portion 79 pivotally secured to the portion 78 by means of pin 80, and an adjustable latch portion 81 pivotally secured to the lower end of the portion 79, by means of pivot pin 82.

Handle 83 is secured to the upper side portion 81 for manipulating the latch assembly as will hereinafter be described.

The latch 81 takes the form of a screw threaded bolt 84 screw threadably engageable within the upper portion 85 of the portion 81 so that the effective length can be adjusted and locked in position by means of lock nut 86. FIG. 6 shows the unlocked position in which the portion 79 and 81 are angulated relative to the portion 78. With the lifting yoke in the horizontal stored position, the assembly is manipulated so that the bolt head 87 engages the socket 77 whereupon the handle is straightened thus snapping the over center lock assembly to the slightly over center position shown in FIG. 5 thereby detachably locking the yoke in the stored position.

Moving the handle sideways to the left relative to FIG. 5, unlocks the assembly so that it can be removed as shown in FIG. 6.

Although the lifting yoke can be moved manually, nevertheless it is desirable that the winch assembly 39 be utilized to raise and lower the assembly. In this connection reference should first be made to FIG. 2 in which a pulley is journalled for rotation upon the upper side of the winch mount 38, said pulley being designated by reference character 88.

A further pulley 89 is journalled for rotation adjacent the junction of the transverse member 34 with one of the side members 33 of the winch yoke and a pair of pulleys 90 and 91 are journalled upon pins 90A and 91A respectively extending from the flange 36 of the lefthand yoke arm 33. These pins are situated almost directly opposite to the brake lugs 72.

A pulley guard plate 92 is secured to the ends of pins 90A and 91A in spaced relationship with the pulleys between the guard plate 92 and the flange 36 and a cable hook 93 is situated upon the upper side of this guard plate 92 and consists of a hooked portion 94 with a spaced apart hook 95 shown in detail in FIG. 7. The aforementioned winch cable 40 is provided with a nut or other protuberance 96 upon the distal end thereof. When it is to be attached to a lifting hook collectively designated 97 and shown in FIG. 8, this nut engages a slotted or bifurcated upper end portion 98 and is retained within socket 99 with a conventional hook assembly 100 depending therefrom as clearly shown. However when elevating or lowering the winch yoke assembly, the cable is detached from the lifting hook 97 and instead engaged around pulley 88, around pulley 89, under pulley 90 and over pulley 91A whereupon it engages around a further pulley 101 (see FIG. 1) journalled upon a pin 102 extending from a support member 103 which in turn extends rearwardly from the front vertical support 19 of the lefthand frame component 13. A guard plate 104 also engages the end of the spindle or pin 102 and a further pin 105 supports the plate in spaced apart relationship from the member 103. The aforementioned cable 40 extends around this pulley and then extends upwardly to be hooked in the hooked assembly 93 formed on the upper side of guard plate 92. With the lifting yoke in the horizontal stored position, the winch is activated to snug the cable thus pulling the lifting yoke against the front latch assembly 76 and preventing rattling from occurring.

However when it is desired to move the winch yoke to the winching position, the latch assembly 76 is disengaged whereupon the winch is wound in thus tightening the cable and due to the routing of the cable around pulleys 90 and 91, the upper end portion of the lifting yoke is elevated relative to the side rails 18, to an angle of approximately 70° to 80°. It is then relatively easy to move the lifting yoke over center so that it takes up the position illustrated in FIG. 4 with the rollers 42 and 43 automatically aligning themselves and engaging the upper and lower edges 18A and 18B respectively of the side rails 18 because the flanged portions 36 are situated against the inner faces 59 of these side rails. When the elevating action commences from the position shown in FIG. 3 towards the position shown in FIG. 4, means are required to anchor the ends and to stop them moving rearwardly, said means taking the form of a roller guide assembly collectively designated 106 and secured to a support 107 depending downwardly from the side rail 18 on the righthand side of the truck body as shown in FIG. 4. This consists of a pair of spaced and parallel guide members 108 secured to 107 by means of U-shaped brackets 109 and having outwardly curved upper ends 110 to guide the lower roller assembly 43 into and out of the guides. When in the lowered position shown in FIG. 3, the first action of the tightening of cable 40 is to pivot the frame inasmuch as the relative position of the pulleys 90 and 91 are moved towards one another. This enters the roller 43 into the vertically situated guides 108 with the roller 43 moving downwardly towards the floor as the winch frame is elevated to its maximum position. When it is pushed over center manually, to the position shown in FIG. 4, the roller leaves the upper end of the guides 108 as shown in FIG. 4 thus permitting the winch yoke to be rolled along the rails 18 as hereinbefore described. When lowering the winch yoke from the winch position shown in FIG. 4 to the position shown in FIG. 3, it is first pushed over center in the direction of arrow 73 with the roller 43 entering the guide channel 106 whereupon the winch may be used to lower it to the horizontal position shown in FIG. 3 whereupon the roller 43 leaves the vertical guide channel 106.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A truck winch assembly for use in a truck cargo area having a pair of side walls, a floor and a front wall, comprising:
   a frame assembly attachable within said truck cargo area, said frame assembly comprising a pair of side frame components secured along the side walls of said truck cargo area, said side frame components further comprising longitudinally extending rail members;

a substantially U-shaped lifting yoke supported by said frame, said yoke comprising a pair of spaced apart elongated leg members and a transversely extending load support member bridging an end of each of the leg members;

mounting means for said yoke comprising a pair of yoke supports spaced on the elongated leg members at points away from the load support member for supporting the yoke on said rail members, said yoke supports providing for pivotal movement of the yoke between a stored position in which the load support member is adjacent the front wall of the cargo area and an elevated load handling position in which the yoke is inclined away from the front wall, said yoke supports providing for displacement of said yoke lengthwise along said rail members between positions in which the load support member of the yoke projects rearwardly of the cargo area to positions in which the load support member of the yoke is over the cargo area, the elongated leg members of said yoke having extensions projecting beneath and into the plane of said rail members, said extensions being engageable with the rail members when the yoke is moved to the elevated load handling position and serving to support the yoke in the elevated load handling position and to restrict pivotal movement of the yoke beyond the elevated load handling position.

2. A truck winch assembly according to claim 1 wherein said yoke supports comprise a pair of rollers, said rollers being mounted adjacent to the ends of said leg members remote from the load support member, each roller being in engagement with the upper surface of one of said rail members, and wherein said extensions comprise a second pair of rollers, each roller of said second pair being displaced from the rollers of the first pair and being mounted beneath and in the plane of one of said rail members of interengagement with the rail members upon movement of the yoke to the elevating load lifting position.

3. A truck winch assembly according to claim 1 or 2 further comprising winch means including a winch assembly mounted on said lifting yoke.

4. A truck winch assembly according to claim 3, said winch assembly comprising a cable and means on the distal end of said cable for connection to said frame assembly for winching said lifting yoke from the stored position towards the load handling position and vice versa, said winch means further comprising at least one guide pulley for guiding said cable and being mounted on one of said leg extensions at a point axially displaced from a pivot axis passing through the yoke supports, the distal end of said cable being connectible to the frame assembly at a point offset below the pivot axis whereby winching the cable in when the lifting yoke is in the stored position lifts said yoke towards the lifting position and winching said cable in when the yoke is in the lifting position winches the yoke toward the storage position.

5. Apparatus according to claim 2, further comprising an upwardly open guide receptacle positioned intermediate the ends of one of said rail members for anchoring the yoke against sliding movement along said track as the yoke is pivoted from the storage to the elevated lifting position, said receptacle being positioned to receive a roller of said second pair as said roller pivots downwardly to thereby restrain the yoke against movement lengthwise of the rail members, said roller serving as a pivot point for pivoting the yoke when the roller is within said upwardly open anchoring means for pivotal movement of the yoke from a forwardly inclined position to a rearwardly inclined position in which the upper roller is in contact with its rail member, said lower roller thereafter moving out of said receptacle into contact with the bottom of its rail member, there being clearance between the receptacle and the adjacent rail members for sliding movement of the yoke lengthwise of the rail members when the roller is out of said receptacle.

6. A truck winch assembly according to claim 5 wherein said extensions further comprise guide flanges extending in adjacent parallel relationship to the rail members for maintaining the yoke in planes substantially perpendicular to the rail members as the yoke is moved from the storage to the elevated load handling position.

7. A truck winch assembly according to claim 1 further including releasable locking means for locking said yoke in the storage position.

8. A truck winch assembly according to claim 1 further including locking means for detachably locking the yoke in position along the length of the rail members.

9. A truck winch assembly according to claim 8 wherein said last named locking means comprises a clamp, means connecting the clamp to said yoke, said clamp comprising a pair of jaws and a threaded member for moving the jaws into and out of clamping engagement with one of said rail members.

10. A truck winch assembly according to claim 9 wherein the means connecting the clamp to the yoke comprises a projecting member on one of said jaws and a downwardly facing recess on the yoke, the projecting member being adapted to fit within said recess for movement along the rail members with the yoke when the clamp is out of clamping engagement with the rail member and to prevent movement of the yoke along the rail members when the clamp is in clamping engagement, said recess being movable out of engagement with the projecting member upon pivotal movement of the yoke so that the yoke is freed for pivotal motion independent of the clamp.

11. A truck winch assembly, for use in a truck cargo area comprising:

a frame assembly attachable within said truck cargo area, said frame assembly comprising a vertically situated front frame component secured at the front of said truck cargo area and a pair of vertically situated side frame components secured along the sides of said truck cargo area, said side frame components further comprising horizontally extending rail elements having upper and lower rail surfaces;

a lifting yoke; and roller means mounted on said lifting yoke for supporting said lifting yoke within said frame assembly for movement from a stored position to an elevated lifting position and vice-versa, said roller means further cooperating with said horizontally extending rail elements for moving said lifting yoke along said frame assembly when said lifting yoke is in the lifting position;

said roller means comprising a first pair of rollers, one roller mounted on each leg of said lifting yoke, for cooperation with the upper rail surfaces of said horizontally extending rail elements, and a second pair of rollers mounted on said lifting yoke, spaced apart from said first pair of rollers, for cooperation with the lower rail surfaces of said horizontally extending rail elements.

12. A truck winch assembly according to claim 11 further comprising guide means for restraining said lower rollers from movement along said rail elements while said lifting yoke is being moved from the stored position to the lifting position, or vice-versa.

13. A truck winch assembly according to claim 12 wherein said guide means comprises a pair of parallel, vertically extending guide elements, mounted in spaced apart relationship in position to receive one of said second pair of rollers during pivotal motion of said lifting yoke from the horizontal stored position to the lifting position or vice-versa.

* * * * *